Fig. 4

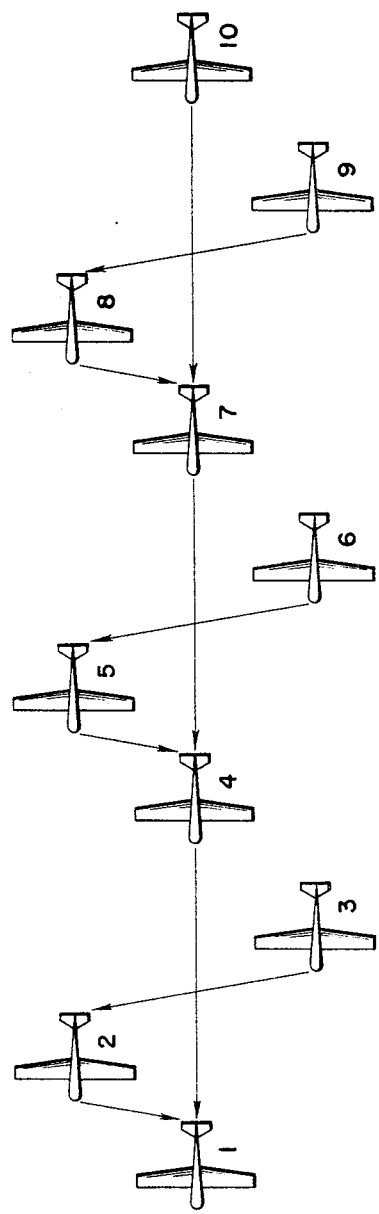
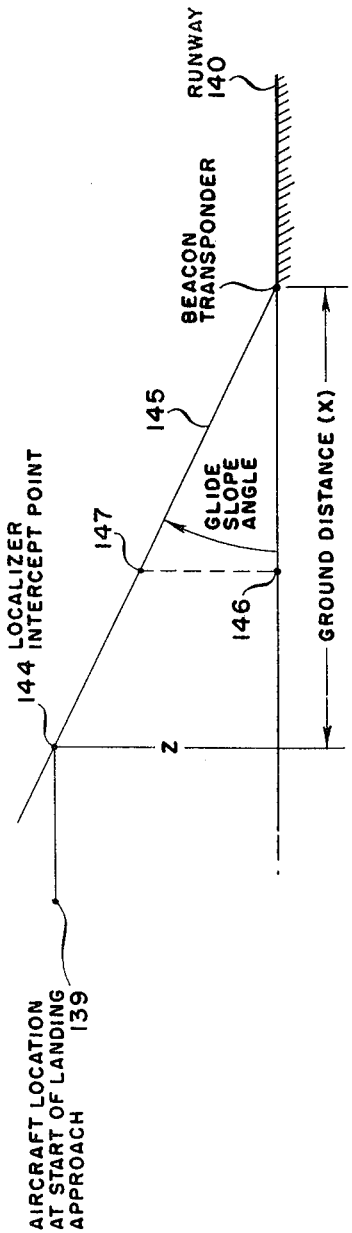
Fig. 3
Fig. 12

TIME SLOT NUMBER

| Formation Position | N/T | 1 | 2 | 3 | 4 | 5 | 6 | 7 | 8 | 9 | 10 |
|---|---|---|---|---|---|---|---|---|---|---|---|
| 1 | N | MTP | | | | | | | | | |
| 1 | T | | ON | | ON | | | | | | |
| 2 | N | MTP | ON | | | | | | | | |
| 2 | T | | | ON | | | | | | | |
| 3 | N | MTP | | ON | | | | | | | |
| 3 | T | | | | | | | | | | |
| 4 | N | MTP | | | ON | | | | | | |
| 4 | T | | | | | ON | | ON | | | |
| 5 | N | MTP | | | | ON | | | | | |
| 5 | T | | | | | | ON | | | | |
| 6 | N | MTP | | | | | ON | | | | |
| 6 | T | | | | | | | | | | |
| 7 | N | MTP | | | | | | ON | | | |
| 7 | T | | | | | | | | ON | | ON |
| 8 | N | MTP | | | | | | | ON | | |
| 8 | T | | | | | | | | | ON | |
| 9 | N | MTP | | | | | | | | ON | |
| 9 | T | | | | | | | | | | |
| 10 | N | MTP | | | | | | | | | ON |
| 10 | T | | | | | | | | | | |

N = NOSE
T = TAIL

Fig. 11

140 — TRUE NORTH — RUNWAY BEARING — GROUND BEACON TRANSPONDER — GROUND DISTANCE (X) — TRUE NORTH — 139 PRE-SET APPROACH INTERCEPT LOCATION — TRUE HEADING — ACFT. LOCATION AT START OF LANDING APPROACH OPERATION 138

INVENTOR.
THOMPSON K. SPEER, SR.
BY
George C. Sullivan
Agent

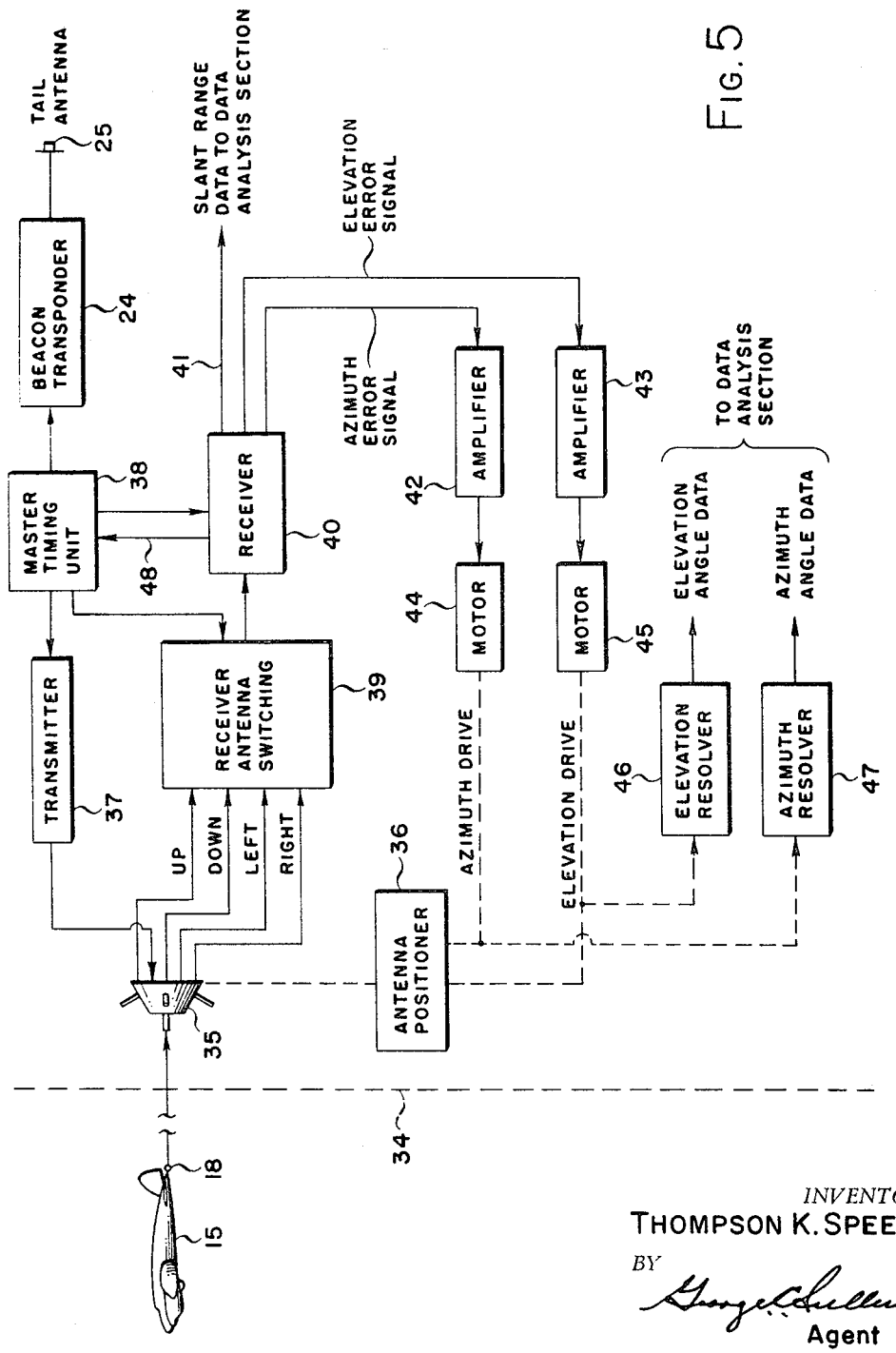

3,409,888
STATION KEEPING AND NAVIGATION
AID SYSTEM
Thompson K. Speer, Sr., Smyrna, Ga., assignor to
Lockheed Aircraft Corporation, Burbank, Calif.
Filed Aug. 15, 1966, Ser. No. 572,366
16 Claims. (Cl. 343—6.5)

ABSTRACT OF THE DISCLOSURE

A station keeping and navigation aid system for use with aircraft and other vehicles to facilitate formation flying and navigation with respect to a known fixed location. Each vehicle is equipped with a radar tracking system and a beacon transponder. The radar system tracks a selected beacon transponder to provide distance and angular information of the vehicle position relative to such transponder, and this information is broken into selected orthogonal distance components. These measured components may be compared with signals indicating a desired position of the vehicle; comparison between the measured and desired signals indicates any mispositioning of the vehicle relative to the desired location. The vehicle beacon transponder enables other similarly equipped vehicles to keep a predetermined formation flight position and each vehicle in a formation flight is assigned a time slot in accordance with a cyclically repetitive timing system. The system also can be used for navigation with respect to a ground-based transponder for various navigation operations.

---

This invention relates in general to a navigation system apparatus, and in particular to an aircraft station keeping and navigation aid system apparatus.

In the operation of a plurality of aircraft in massed or formation flying, it is desirable, if not imperative, that some technique or system be provided for enabling the pilot of each aircraft in the formation to determine whether his aircraft is presently occupying its proper pre-assigned location. An example of a mission requiring precise locational control of the aircraft in a formation is found in a paradrop of material and/or personnel where a small ground dispersion area is mandatory for tactical reasons.

One approach taken in the past to this problem of formation flying required little or no auxiliary apparatus. The pilot of a following aircraft picked out a portion of the aircraft with which he was maintaining a positional reference and visually located this portion of the lead aircraft with respect to some fixed reference point on his wind screen or elsewhere in the cockpit of the following aircraft. Maintaining formation position by this technique demanded nearly-constant sighting on the lead aircraft and required continuous correction with the flight controls and engine power settings to maintain a relatively constant formation location with respect to the lead aircraft. Such conditions obviously are conducive to pilot tenseness and fatigue after a relatively short period of time. Moreover, even under good visual flying conditions, this system is capable of only moderate locational accuracy. Under instrument flying conditions, such as when flying through clouds or while flying at nighttime, the foregoing method of formation flying obviously becomes impracticable because of the inability of the pilots to maintain visual contact with their chosen lead or reference aircraft.

The problem of maintaining aircraft locational position in formation flying, sometimes referred to as "station keeping," has been rendered even more acute by the advent of modern aircraft whose high speed requires even greater station keeping accuracy and substantially reduces the margin of permissible error in station keeping.

Still another navigation problem confronting the crew of one or more aircraft is that of locating accurately a preselected spatial position whereat, for example, material and/or personnel are to be air dropped. While this problem may be solved with relative ease for air drops over territory which is easily accessible by ground or which is controlled by friendly forces, the problem is considerably more acute with regard to air drops over territory not easily accessible by ground for the installation of relatively elaborate ground-based terminal navigation apparatus, or over territory not controlled by friendly forces. Thus, there arises a need for some system or technique, taken either singly or in combination with a station keeping system, which will enable the pilot of an aircraft to determine accurately when his aircraft is at a predetermined altitude and position. This navigational technique generally is referred to as "terminal approach" navigation.

Yet another problem with which an aircraft pilot is faced is that of making the correct landing approach to a runway or other landing area at nighttime or during other conditions of limited visibility. To execute this maneuver, the pilot generally must position his aircraft at a particular point in space aligned with and at some distance from the desired touchdown point on the runway. The pilot then must fly down the desired glide slope so that when he arrives within visual flying distance of the runway, as by emerging from cloud cover or by approaching within sighting distance of the runway lights, his aircraft is properly positioned for a safe landing.

Equipment exists in the prior art which can solve the aforementioned problem of landing approach control. Examples of such equipment are the Instrument Landing System (ILS) and the Ground Controlled Approach (GCA) system; however, both of these systems require extensive and costly installations on the ground at the runway location, and the ILS system additionally requires the installation in the aircraft of apparatus for processing the ILS signals. Moreover, this airborne ILS equipment generally is not compatible with other equipment for performing the aforementioned station keeping and terminal navigation aid functions.

According to the present invention, there has been devised an airborne station keeping and navigation aid system which performs the three functions of formation flying station keeping, terminal aid navigation, and landing approach path control. In the latter two of these functions, only a simple beacon transponder need be located on the ground at or within the general vicinity of the intended terminal location or aircraft touchdown location. In the station keeping mode of operation of this invention, each aircraft except the formation lead aircraft evaluates its actual position with respect to one other aircraft in the formation and provides output signals either to the pilot or to an automatic flight control system indicating any variance between the actual position of the aircraft and the intended position of the aircraft with respect to its lead aircraft in the formation.

Accordingly, an object of this invention is to provide an improved station keeping system.

Another object of this invention is to provide an improved terminal navigation aid system.

Still another object of this invention is to provide an improved landing approach path guidance system.

A further object of this invention is to provide an aircraft station keeping and navigation aid system wherein the functions of station keeping, terminal navigation, and landing approach path guidance can be performed with a coordinated arrangement of apparatus.

Yet another object of this invention is to provide an aircraft station keeping system which can provide command signals indicating the actual position in a formation of aircraft of an aircraft relative to a predetermined position in the formation.

A further object of this invention is to provide an aircraft station keeping and navigation aid system which can provide position command signals suitable for introduction into a steering command apparatus.

A still further object of this invention is to provide an aircraft station keeping system that furnishes an accurate indication of the thrust line separation, lateral separation, and vertical separation of a follow aircraft with respect to a selected lead aircraft.

Another object of this invention is to provide an aircraft navigation aid which can accurately indicate the position of the aircraft relative to a preselected location on the ground.

Still another object of this invention is to provide an aircraft terminal navigation aid which does not require that cooperative ground based equipment be situated in the immediate vicinity of a predetermined location to which an aircraft is being directed.

Still another object of this invention is to provide an aircraft terminal navigation aid which can be used in conjunction with a beacon transponder positioned at a known distance and bearing relative to a predetermined location to which the aircraft is being directed.

A further object of this invention is to provide a landing approach path control which can be used with a beacon transponder positioned at a known location with respect to a runway to guide an aircraft to a predetermined intercept point and then to provide command signals indicative of the appropriate glide path to be flown to reach a landing flare-out point from the intercept point.

Yet another object of this invention is to provide a navigation aid which can be used in cooperation with a beacon transponder at a known location to provide position location information for an aircraft at an unknown location.

The exact nature of this invention as well as other objects and advantages thereof will be readily apparent from consideration of the following specification relating to the annexed drawings in which:

FIGURE 3 is a plan view showing a formation of ten aircraft engaged in a station keeping operation according to an embodiment of this invention;

FIGURE 4 is a timing chart showing the time allocation of the interrogate and transponder functions for each of the aircraft of FIGURE 3;

FIGURE 5 is a block diagram showing the data procurement section of apparatus according to an embodiment of this invention;

Figure 7:
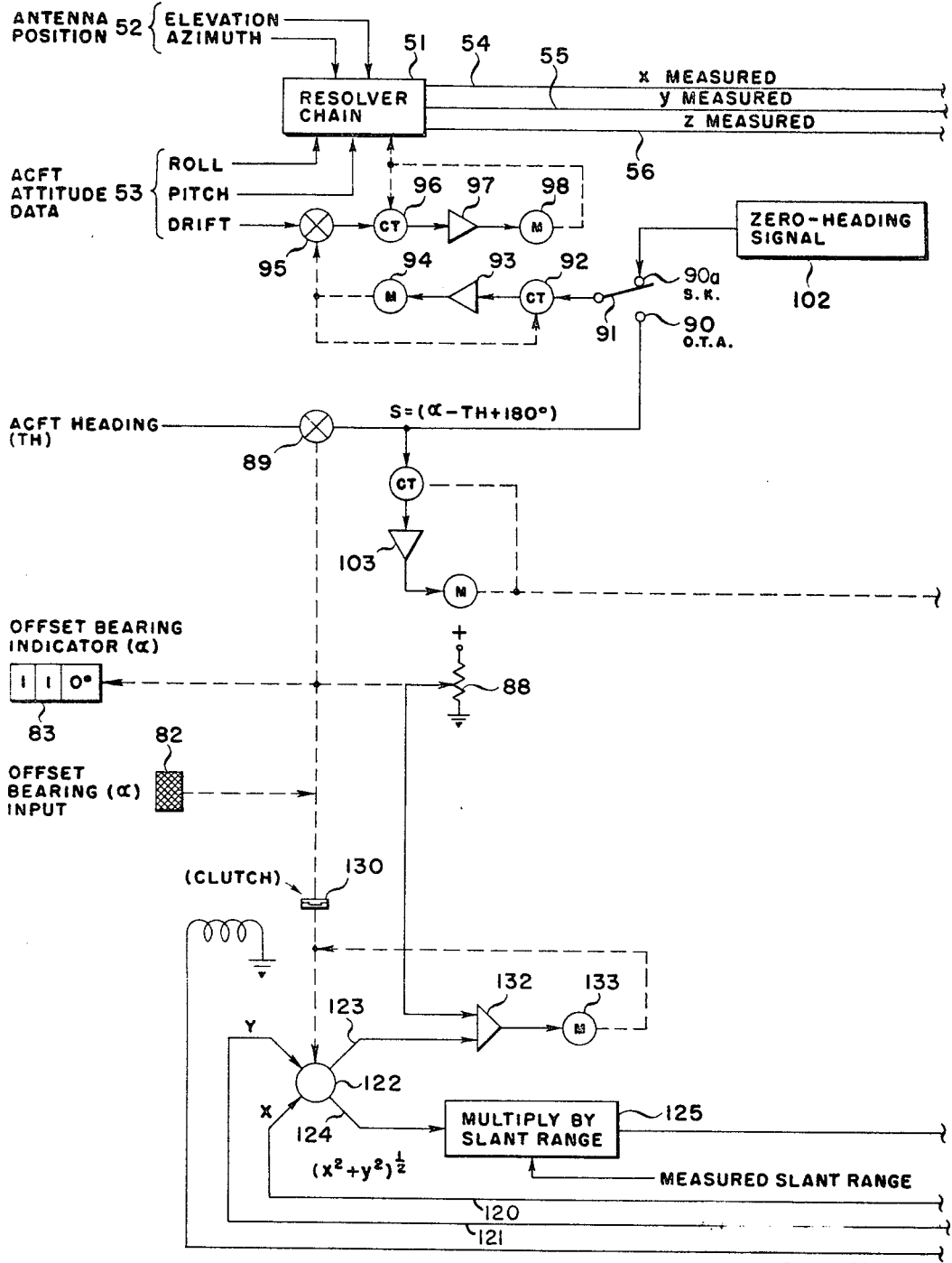
Figure 8:
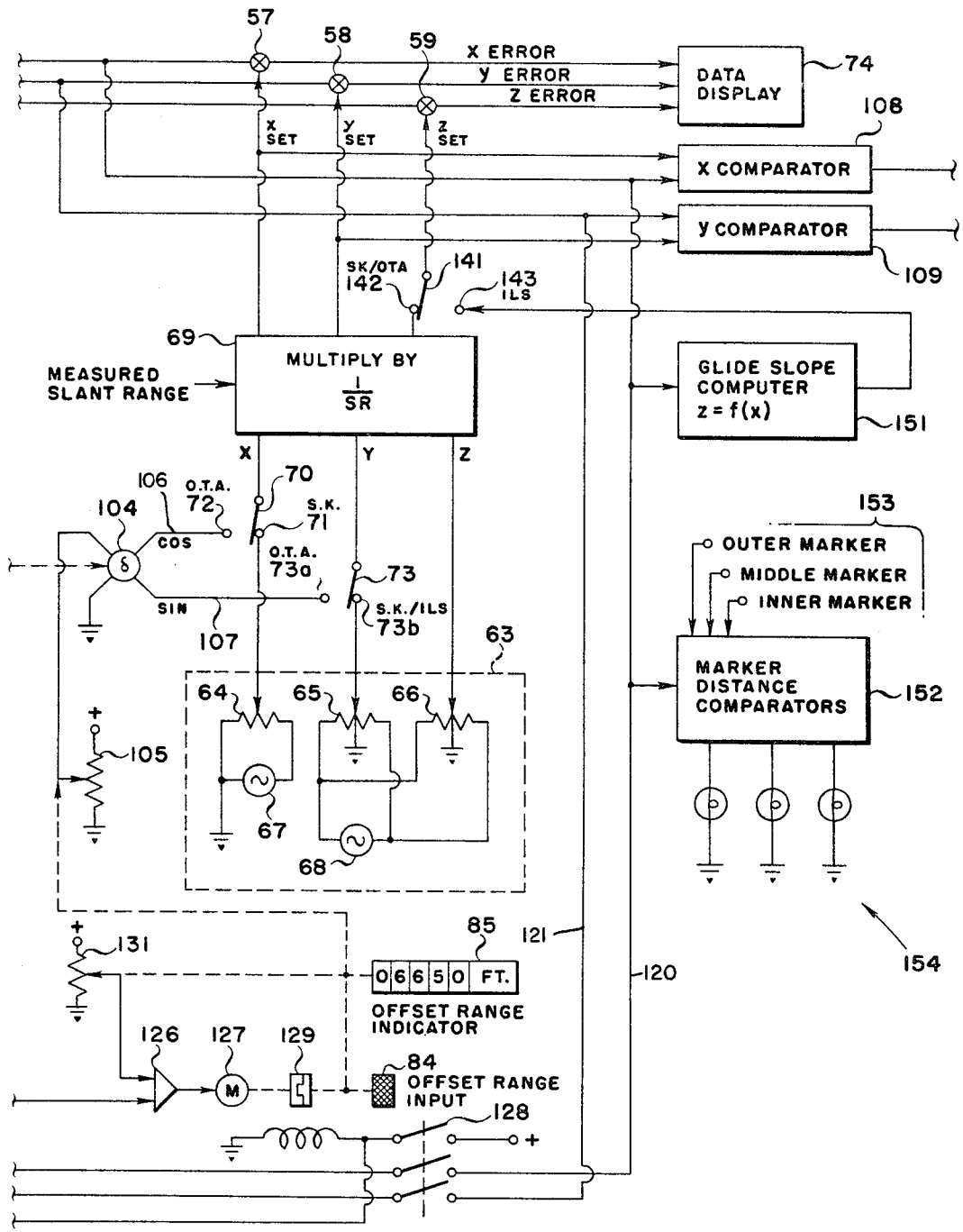
Figure 9:
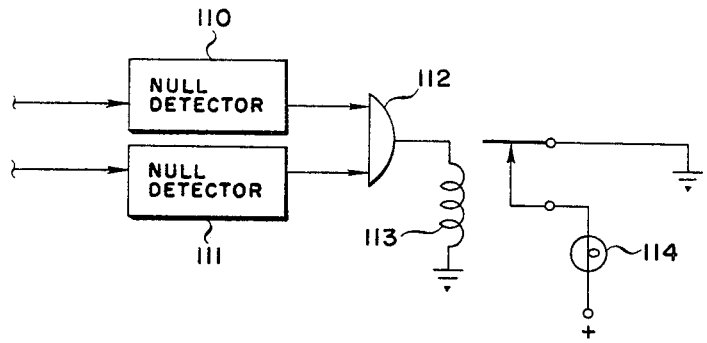
Figure 10:
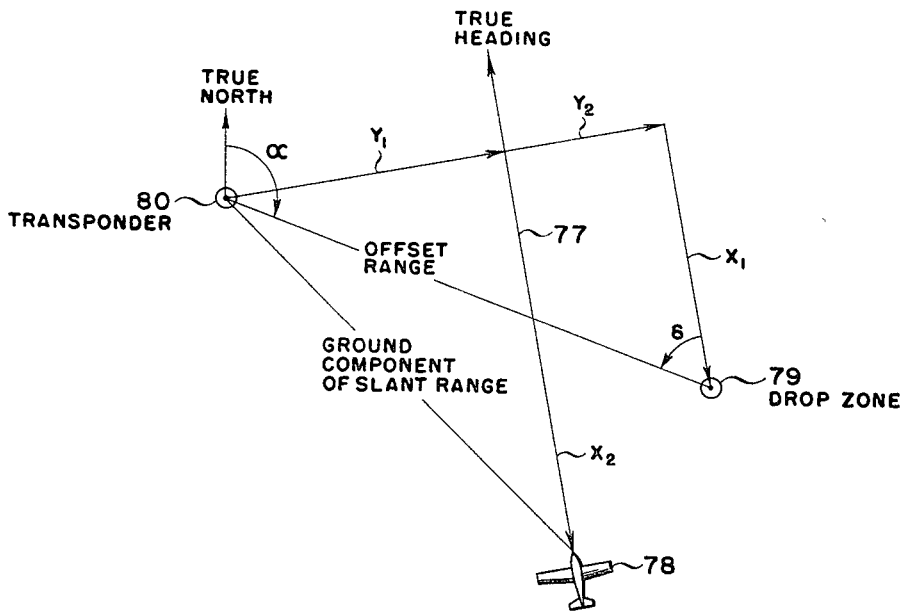

FIGURES 7, 8 and 9 make up a block diagram showing the data analysis section of apparatus according to the illustrative embodiment of this invention;

FIGURE 10 is an illustration of the geometric considerations involved in the terminal approach mode of apparatus according to the illustrative embodiment of this invention;

FIGURE 11 is a drawing showing the geometric considerations in the azimuth plane involved in the landing approach path control mode of apparatus according to the illustrative embodiment of this invention; and FIGURE 12 is a drawing showing the geometric considerations in the elevation plane involved in the landing approach path control mode of apparatus according to the illustrative embodiment of this invention.

Stated generally, each aircraft utilizing a station keeping system according to the herein-disclosed embodiment is equipped with a beacon transponder having an omnidirectional antenna positioned at the aft end of the aircraft and an interrogator unit having a direction-sensitive atenna situation at the fore end of the aircraft. In a formation of aircraft wherein this station keeping system is being applied, each aircraft excepting the lead aircraft follows another designated aircraft in the formation. The interrogator unit in the follow aircraft transmits an interrogation signal which is received by the beacon transponder in the associated lead aircraft. This beacon transponder then transmits a reply signal which is received by the interrogator unit in the follow aircraft. The directional antenna in the follow aircraft determines the position of this aircraft relative to its lead aircraft, and the slant range or line of sight range between these two aircraft is obtained by measuring the time taken for a response to the interrogation pulse.

The angular position of the lead aircraft is converted into a set of unit vector components taken along orthogonal axes and corresponding to the direction of the lead aircraft relative to the follow aircraft, and this set of unit vector components is combined with roll, pitch and yaw information derived from the gyro system in the follow aircraft so that there is defined a set of three-dimensional orthogonal unit vector components spatially defining the measured location of the follow aircraft with respect to the lead aircraft and unaffected by short-term variations in the attitude of the follow aircraft. This set of unit vector components then is compared with a second set of unit vector components produced by pre-set desired separation signals indicative tof the predetermined desired position in the aircraft formation of this particular follow aircraft. The differences, if any, between the measured and desired separation signals are used to provide command signals for the pilot or for an automatic pilot system, indicating any correctional maneuvers to be taken by the follow aircraft. The interrogator units and transponder beacons of all aircraft in a particular formation utilize a single frequency with time-sharing capabilities to lessen band-width requirements and to ensure that only the proper pair of aircraft are engaged in interrogating and transponding functions at any given time.

The interrogator units and the station keeping system according to this invention associated therewith can additionally be utilized in conjunction with a ground-based transponder unit or a transponder unit situated at some other known location with respect to a terminal location. To direct one or more aircraft to this location, the fixed transponder unit in this instance may be located as much as several miles from the intended target area, depending on the signal strength of the interrogator unit and the transponder beacon. This portion of the aircraft station keeping apparatus of this invention also may be utilized in conjunction with a transponder beacon having a known position with respect to an aircraft runway or other landing area to direct the aircraft to the proper line of approach for the runway and then to establish the proper glide path to bring the aircraft into position for flare-out and subsequent landing.

Figure 1:
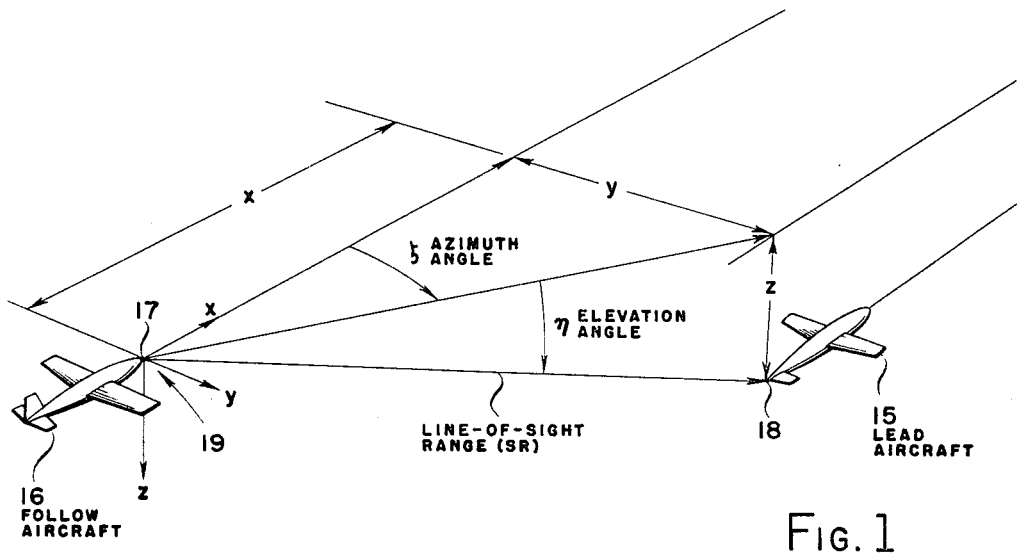
FIGURE 1 is an isometric drawing showing a lead aircraft and a follow aircraft in a station keeping relationship.

Turning now to FIGURE 1 for a discussion of the considerations involved in the problem of formation flying station keeping, there is shown a pair of aircraft 15 and 16, with aircraft 15 of this pair being designated as the "lead" aircraft and aircraft 16 of this pair being designated as the "follow" aircraft. These two aircraft could constitute a formation of only two aircraft, or these two aircraft could comprise a portion of a larger formation made up of a larger number of aircraft. It can be seen that the nose 17 of follow aircraft 16 is displaced a certain line of sight distance from the tail 18 of lead aircraft 15. This line of sight distance, hereafter referred to as the "slant range," can be broken down into an X component taken along a line coincident with the average or long-term heading of follow aircraft 16, a Y component perpendicular to the X component and designating the lateral displacement of aircraft 16 with respect to aircraft 15, and a Z component perpendicular to the X, Y plane and denoting the amount of vertical separation of the follow aircraft with respect to the lead aircraft. The relative vector relationship of these three distance components is rpresented by the orthogonal unit vector components $x$, $y$ and $z$ indicated generally at 19.

The vector representing the slant range distance between nose 17 and tail 18 has some angular relation with respect to the $x$ unit vector component or long-term heading of follow aircraft 16, and this angular relationship may be represented by an azimuth angle component shown in FIGURE 1 as $\zeta$ and an elevation angle $\eta$ component. For the purpose of the two-aircraft station keeping arrangement shown in FIGURE 1, follow aircraft 16 has an interrogator unit including a directional antenna situated at nose 17 and lead aircraft 15 has a beacon transponder having an antenna situated on or adjacent to the tail 18. The radiation pattern of the antenna associated with the beacon transponder should be omnidirectional or at least omnidirectional over a 180° arc centered along the longitudinal axis of the lead aircraft and seen as looking toward the aft end thereof. Of course, aircraft 15 may also have an interrogator unit for interrogating an aircraft which it may be following, and aircraft 16 may also have a beacon transponder for answering interrogating signals from another aircraft which may be following aircraft 16. If the receiver portion of the transponder unit located on any follow aircraft is of the type capable of causing boresight homing of the nose antenna onto the signal received from the beacon transponder in a particular lead aircraft, then it can be seen that this homing operation establishes the azimuth angle $\zeta$, the elevation angle $\eta$, and the slant range of the lead aircraft with respect to the follow aircraft.

Figure 2:
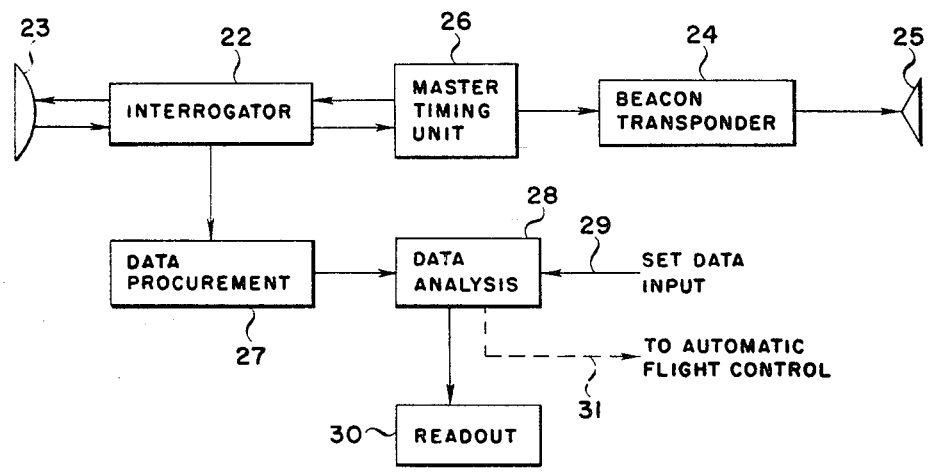
FIGURE 2 is a functional block diagram of apparatus according to an embodiment of this invention as contained in an aircraft.

Turning now to FIGURE 2, there is shown in general the apparatus according to this invention which is carried on a given aircraft equipped to interrogate a lead aircraft and also equipped to respond to interrogating signals from still another aircraft in a follow position with respect to the given aircraft. Interrogator unit 22, which includes a transmitter and receiver, is connected by suitable RF transmission lines to directional antenna 23 situated at the front of the aircraft. Antenna 23 may be of the type which is mechanically positionable in both the azimuth plane and the elevation plane by suitable mechanical devices; or, alternatively, scanning of antenna 23 may be accomplished partially or entirely by electronic techniques as known to those skilled in the art. In any event, antenna 23 preferably should be capable of scanning at least 180° in both the azimuth and elevation planes. The amount of angular scan available in the system, of course, determines the amount of angular deviation which may be undergone between a follow aircraft and a lead aircraft while maintaining station keeping between these two aircraft.

A beacon transponder 24 connected to a suitable antenna 25 furnishes response signals to interrogations from a following aircraft, if any, in the formation pattern. In the usual station keeping arrangement, antenna 25 has an omnidirectional radiation pattern and is mounted on the aircraft in a suitable location such as the aft portion thereof. Operation of both interrogator 22 and beacon transponder 24 is controlled by master timing unit 26 in a manner described below.

If an interrogation signal from interrogator 22 elicits a response from a beacon transponder in a lead aircraft, this response signal is supplied to data procurement section 27. Here the signal from the antenna is analyzed to determine the azimuth angle, elevation angle, and slant range of the lead aircraft with respect to the follow aircraft. This information then is supplied to data analysis section 28 which operates on this information to derive the measured separation of the lead and follow aircraft along the $x$, $y$ and $z$ axes and which then compares this derived information with data previously inserted into the apparatus at 29 and designating the proper separation between the two aircraft that will enable the follow aircraft to maintain the desired formational position with respect to the lead aircraft. Any discrepancy between the measured separation and the desired separation is indicated in readout section 30. This readout may, if desired, be in the form of command signals directing the pilot to fly the aircraft in the proper direction or to make appropriate throttle adjustments to cause the aircraft to reach its proper location in the formation. Alternatively, this output may be supplied, as shown at 31, to a suitable automatic flight control system to enable the aircraft automatically to maintain its proper pre-set position in the formation.

In any formation of aircraft utilizing a station keeping system according to this invention and having more than two aircraft assigned to the formation, it is evident that an attempt to utilize only a single frequency for all of the interrogator units and beacon transponders involved would be likely to result in false or unwanted responses from a beacon transponder on an aircraft not assigned to lead the particular interrogating aircraft. Conversely, assigning separate frequencies of operation to each interrogator-transponder lead-follow pair would unnecessarily complicate the system, would require extensive and time-consuming system adjustment prior to each formation flight, and would result in complications in the event that one or more aircraft in a formation were required to leave the formation. To overcome this problem, the interrogator units and beacon transponders on all aircraft of a given formation transmit and receive on a single frequency, for example 5,090 megacycles. A time-sharing technique is utilized to ensure that only one interrogator unit and one beacon transponder are activated at any particular instant of time.

An example of this time-sharing technique is depicted in FIGURES 3 and 4. As set forth in FIGURE 3, there is shown a formation of ten aircraft with the first aircraft in formation being designated in this figure as the first aircrat. As indicated by the arrows extending from the noses of each aircraft, except the lead aircraft, to the tail of another aircraft, each aircraft is assigned to follow one particular aircraft in the formation. Thus, aircraft number two is assigned a position in the formation to the right of aircraft number one and is in a follow relationship with respect to this aircraft. Aircraft number three is assigned a formation position to the left of aircraft number one and aft of aircrafts one and two. Aircraft number three is assigned to follow aircraft number two, although aircraft number three could, if desired, follow aircraft number one instead. Aircraft number four is assigned a formation position in line with aircraft number one and behind aircraft number three. It should be remembered that FIGURE 3 is a plan view and that the aircraft in the depicted formation may also be flying at different altitudes.

Each aircraft in a formation utilizing the station keeping system of this invention is assigned a time slot of, for example, 500 microseconds. During the time slot assigned to a particular aircraft, the interrogator transmitter in that aircraft transmits an interrogation pulse having a width of, for example, 0.3 microsecond. During this time slot, only the beacon transponder in the aircraft designated to lead the aircraft assigned to this time slot is capable of responding to an interrogation signal, and the transponders on all of the other aircraft in the formation are momentarily disabled. Thus, assuming that the transponder in the assigned lead aircraft receives the interrogation signal, a response signal is transmitted by this transponder after a suitable time delay of, for example, 0.4 microsecond. By way of example only, the response signal transmitted by the beacon transponder may be 1.5 microseconds wide.

The pairing of interrogator and transponder functions for the ten aircraft formation of FIGURE 3 is depicted in FIGURE 4 wherein the vertical column of numbers at the left of the chart identifies the particular aircraft in the formation and the horizontal row of numbers across the top of the chart refers to a particular time slot number. The letters "N" and "T" adjacent the formation position number refer to "nose" and "tail," respectively, and indicate whether the nose-associated interrogator function or the tail-associated transponder function is activated in a particular time slot.

The master timing unit 26, contained in each aircraft equipped according to this invention, includes a clock which defines a number of time slots equal in number to the number of aircraft in the formation. So that the clocks of the various aircraft in the formation may remain in syncronism, the lead aircraft of the formation is selected to occupy time slot one and this aircraft transmits a master timing pulse during each first time slot. This master timing pulse, indicated as "MTP" in FIGURE 4, is received simultaneously by each of the remaining aircraft in the formation. Since the master timing unit of each of these aircraft has caused the several interrogator receivers to be activated to receive a master timing pulse after the end of the tenth or final time slot in the series, reception of the master timing pulse by each of the remaining aircraft in the formation functions to resynchronize the master timing unit clocks thereof for another series of ten time slots.

At the start of a station keeping flight according to this invention, the nose antenna and the associated interrogator unit of each aircraft excepting the number one aircraft are switched to a search mode for initial station keeping rendezvous. During this period all aircraft except the lead aircraft are listening and the lead aircraft is transmitting master timing pulses in its assigned time slot number. When these master timing pulses are received by the station keeping system in one of the remaining aircraft, a specified time delay, which is a function of the time slot number for that particular aircraft, is introduced and then the station keeping system in that aircraft begins transmitting interrogation pulses in the proper assigned time slot. The transponder also is made operational in its assigned time slot or slots. The station keeping system of this aircraft remains in the search mode, however, until a reply pulse is received in the proper time slot from the transponder in the lead aircraft assigned to this particular aircraft. The station keeping system then switches from the search mode to the track or normal station keeping mode of operation, and a suitable indicator may be provided to alert the pilot that station keeping tracking has commenced. The station keeping system can be designed so that if a given number, for example four, of consecutive interrogating pulses produce no beacon response then the station keeping system of that aircraft reverts to the search mode until a response is again received in the proper time slot.

During the search mode of operation described above, directional antenna 23 may be caused to scan continuously over its entire range of scan in at least the azimuth plane, with this antenna changing to boresight homing as described below when the track mode is achieved. This could be accomplished by means of a suitable source of scanning signals, not shown, connected to the antenna positioning mechanism during the search mode and automatically switched out during the track mode.

It should be understood that the station keeping system of this invention is not limited to formation of exactly ten aircraft, as this number was chosen only for exemplary purposes in FIGURES 3 and 4. For a formation capability of ten aircraft and assuming each time slot to equal 500 microseconds in width, then each aircraft in the formation makes 200 position measurements each second. If the total number of aircraft in the formation is increased to twenty aircraft, then 100 position measurements are performed by each aircraft each second. Even with thirty aircraft in a formation, the rate of position measurement is essentially continuous with over sixty-six measurements each second being made by each aircraft. Moreover, the particular lead-follow aircraft dependency shown in FIGURE 3 is by way of example only, and any other arrangement which permits line of sight transmission between the directional antenna 23 of a follow aircraft and the omnidirectional antenna 25 of its associated lead aircraft may be utilized. By way of further example, each of the aircraft in the formation may have a sequential nose-tail relationship analogous to the links on a chain. If one or more aircraft should be forced to leave the formation, the aircraft assigned to follow the departed aircraft can easily change to a follow relationship with another aircraft, as explained below.

Having established the sequence of operation of the aircraft in a formation utilizing this station keeping system, attention can be directed to the apparatus whereby the data indicating the actual position of a follow aircraft with respect to a lead aircraft are derived. In FIGURE 5, there is shown in greater detail a portion of the apparatus depicted in FIGURE 2. All of the apparatus in FIGURE 5 situated to the right of vertical dashed line 34 is contained within a single aircraft which is tracking a beacon transponder having an antenna situated on the tail 18 of a lead aircraft 15.

Situated on the follow aircraft is a suitable directional antenna 35. As stated earlier, this antenna may be of the gimballed or movable type whose mechanical position in azimuth and elevation is determined by antenna positioner 36. For purposes set forth below, antenna 35 is of the type capable of effectively operating in the receiving mode so as to have a major lobe positioned alternatively at either side of the antenna boresight in both the elevation and azimuth planes.

Interrogation pulses are supplied from transmitter 37 under the control of master timing unit 38 to antenna 35 to produce a transmitted signal with a major lobe directed along the boresight of the antenna. Signals from the four antenna receiving lobes are diagrammatically supplied individually to a receiver antenna switching network 39. The output of this switching network, whose function is described below, passes to receiver 40. During the tracking mode of operation, the receiver antenna switching network 39 and the receiver 40 are selectively operated at the control of master timing unit 38. As stated above, however, during the search mode of operation, the receiver is operative at all times until a coded master timing pulse from the lead aircraft in the formation is received. When this occurs, a signal is sent from the receiver 40 via the re-set line 48 to master timing unit 38 to initiate the time slot sequencing operation.

Receiver 40 incorporates a time counting circuit initiated by the transmission of an interrogation pulse and terminated by the reception of a response from the beacon transponder. The elapsed time counted by the counting circuit is a function of the separation between the lead aircraft and the follow aircraft, and this data in the form of a scalar value is present at output 41 of receiver 40. From this it can be seen that the slant range information is contained in the leading edge of the pulse received from the beacon transponder.

Figure 6:
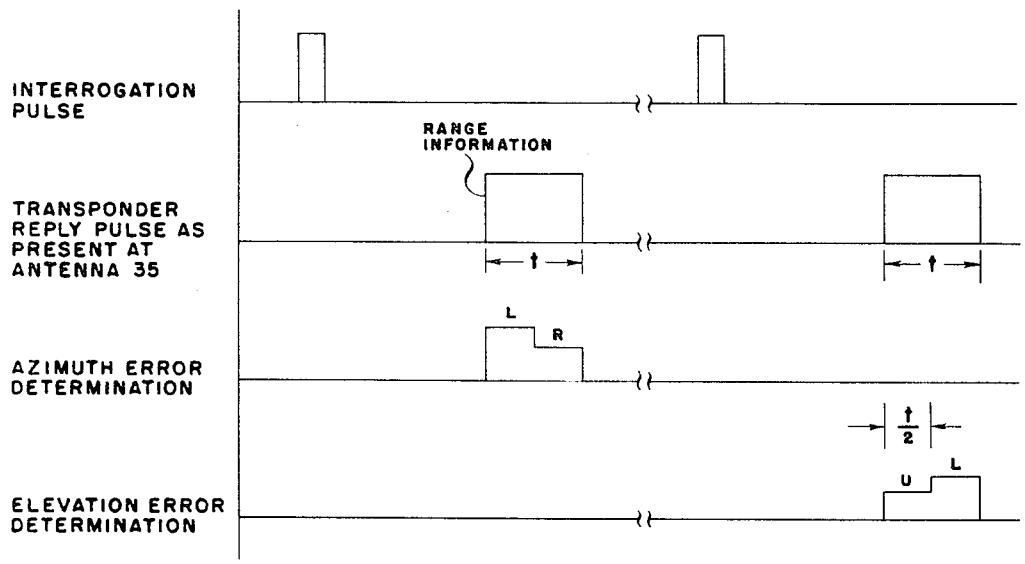
FIGURE 6 is a pulse diagram illustrating the derivation of azimuth and elevation error information in the receiver portion of the apparatus of FIGURE 5.

The purpose and function of the multiple antenna receiving lobes and the switching network 39 may best be explained by reference to FIGURE 6. Assuming the pulse transmitted by the beacon transponder to be some time $t$, for example 1.5 microseconds wide, the first half of this 1.5 microsecond pulse is received on one of the azimuth displaced lobes of the antenna, for example the left lobe. After 0.75 microsecond have elapsed, the switching network 39 switches from the left lobe to the right lobe. These switched signals are received and amplified by receiver 40, and the video output thereof is applied to a pulse amplitude comparison circuit where the amplitude of the signal received on the right lobe is compared with the amplitude of the signal received on the left lobe. Since the two lobes are positioned symmetrically with respect to the antenna boresight, any difference in amplitude between the right lobe and left lobe produces an error signal indicating that the antenna boresight is displaced in azimuth with respect to the location of the beacon transponder. It should be appreciated that the interrogation and/or response pulses may actually consist of a series of coded pulses and are shown in FIGURE 6 as solid pulses without intent to limit the practice of this invention thereto.

On the next beacon transponder signal received at this aircraft, the first portion of the received signal is received on the upper lobe of antenna 35 and the last portion of the received signal is received on the lower lobe of this antenna. A similar comparison between the amplitudes of the upper lobe and lower lobe signals produces an error signal indicating the displacement of the antenna boresight in elevation with respect to the beacon transponder. A simultaneous determination of azimuth and elevation error signals can be made if a pair of receivers is provided in place of the single receiver 40.

These error signals are taken as outputs of receiver 40 and pass to amplifiers 42 and 43, respectively. The amplified outputs are supplied to antenna positioning motors 44 and 45, respectively, and the mechanical outputs of these motors are supplied to antenna positioner 36 to cause repositioning of the antenna so that the boresight thereof is directed toward the tail 18 of the lead aircraft, at which time the azimuth error signal and the elevation error signal will be zero. The mechanical output of each of motors 44 and 45 is also coupled to azimuth resolver 47 and elevation resolver 46, and the electrical output of each of these resolvers is supplied to the data analysis section to indicate the azimuth and elevation positions of antenna 35 with respect to the longitudinal axis of the follow aircraft 16 on which the antenna is gimballed.

The apparatus as set forth in FIGURE 5 hereof yields outputs indicating the measured slant range from the follow aircraft to the lead aircraft, and the measured azimuth angle and elevation angle positions assumed by antenna 35 of the follow aircraft in tracking the transponder beacon of the lead aircraft. As shown by FIGURE 1, however, the information desired by pilots and by those planning a formation flight is the thrust line separation X, the lateral separation Y, and the vertical separation Z. Moreover, since the elevation and azimuth data supplied from resolvers 46 and 47 define the angular position of antenna 35 with respect to the air frame of the follow aircraft, it is apparent that these angles indicate the true bearing of the lead aircraft with respect to the follow aircraft only in the case where the follow aircraft is exactly flying on its long-term heading course and is not undergoing any short-term attitude deviations in roll, pitch or yaw. Accordingly, the elevation, azimuth and slant range data developed in the data procurement section as shown in FIGURE 5 must be converted to X, Y and Z components or to $x$, $y$ and $z$ unit vector components, and these components must be corrected to provide unvarying and accurate indications of the measured separation distances between the follow and the lead aircraft irrespective of short-term attitude variations of the follow aircraft.

Referring again to FIGURE 1, the following equations defining the separation distances between the lead and follow aircraft can be obtained: :

$$X = SR \cos \eta \cos \zeta$$
$$Y = SR \cos \eta \sin \zeta$$
$$Z = SR \sin \eta$$

or, writing in matrix form, $$\begin{matrix} & \text{Antenna} & & \text{Antenna} & & \text{Slant} \\ & \text{Azimuth} & & \text{Elevation} & & \text{Range} \end{matrix}$$

$$\begin{bmatrix} X \\ Y \\ Z \end{bmatrix} = \begin{bmatrix} \cos \zeta & -\sin \zeta & 0 \\ \sin \zeta & \cos \zeta & 0 \\ 0 & 0 & 1 \end{bmatrix} \cdot \begin{bmatrix} \cos \eta & 0 & \sin \eta \\ 0 & 1 & 0 \\ -\sin \eta & 0 & \cos \eta \end{bmatrix} \cdot \begin{bmatrix} SR \\ 0 \\ 0 \end{bmatrix}$$

To these equations must be added the corrections for aircraft roll, pitch and yaw. Referring to the unit vector components 19 of FIGURE 1, drift ($d$) is defined as a rotation of the unit vector component $x$ and the $z$ unit vector component, with a positive drift angle being defined as a clockwise rotation as seen from above of the $x$ vector component around the drift axis of the $z$ vector component. Pitch ($\theta$) is defined as a rotation of the $x$ unit vector component around the $y$ unit vector component, with a counterclockwise rotation of the $x$ vector component as seen from the right side of the aircraft producing a positive pitch angle. Roll ($\phi$) is defined as a rotation of the $y$ unit vector component around the $x$ unit vector component, with a clockwise rotation of $y$ in the forward-looking direction so as to produce a right wing down attitude corresponding to a positive roll angle.

Since the process of correction for each of these factors is done by rotation of coordinates, the desired equation is represented in matrix form for the corrected values of X, Y and Z is:

$$\begin{matrix} \text{Drift} & \text{Pitch} & \text{Roll} \end{matrix}$$

$$\begin{bmatrix} X \\ Y \\ Z \end{bmatrix} = \begin{bmatrix} \cos d & -\sin d & 0 \\ \sin d & \cos d & 0 \\ 0 & 0 & 1 \end{bmatrix} \cdot \begin{bmatrix} \cos \theta & 0 & \sin \theta \\ 0 & 1 & 0 \\ -\sin \theta & 0 & \cos \theta \end{bmatrix} \cdot \begin{bmatrix} 1 & 0 & 0 \\ 0 & \cos \theta & -\sin \theta \\ 0 & \sin \theta & \cos \theta \end{bmatrix}$$

$$\begin{matrix} & \text{Antenna} & & \text{Antenna} & & \text{Slant} \\ & \text{Azimuth} & & \text{Elevation} & & \text{Range} \end{matrix}$$

$$\begin{bmatrix} \cos \zeta & -\sin \zeta & 0 \\ \sin \zeta & \cos \zeta & 0 \\ 0 & 0 & 1 \end{bmatrix} \cdot \begin{bmatrix} \cos \eta & 0 & \sin \eta \\ 0 & 1 & 0 \\ -\sin \eta & 0 & \cos \eta \end{bmatrix} \cdot \begin{bmatrix} SR \\ 0 \\ 0 \end{bmatrix}$$

The correct values of the unit vector components $x$, $y$ and $z$ are obtained by omitting the slant range factor from the above matrix.

The trigonometric operations prescribed in the foregoing equations are performed in resolver chain 51 as shown in FIGURE 7. Resolver chain 51 is supplied at 52 with measured elevation and azimuth angular data as developed in data procurement section 27 shown generally in FIGURE 2 and specifically in FIGURE 5, and the resolver chain additionally is supplied with corrective angular data corresponding to aircraft roll, pitch and drift, as indicated at 53. This roll and pitch angular data is obtained from a suitable source such as the aircraft gyros, while the drift information, corresponding to any angular difference caused by windage between the long-term aircraft heading and the aircraft compass heading, is obtained from a suitable source such as the aircraft Doppler radar or from another aircraft gyro which represents an X axis zero reference according to the long-term heading of the aircraft and which extracts short-term heading variations of the aircraft as yaw information. As indicated in FIGURE 7, the drift input to resolver chain 51 is converted to angular shaft movement by apparatus whose identity and function is described below. The other inputs to this resolver chain also are converted to mechanical shaft motion in a manner known to those skilled in the art.

The outputs of resolver chain 51 are three voltages taken along lines 54, 55 and 56 and corresponding respectively to the unit vector components $x$, $y$ and $z$. These vector signal outputs are supplied to corresponding signal comparators 57, 58 and 59.

*Station keeping*

Since each pilot engaged in a station keeping operation knows that his aircraft should maintain a certain spatial relationship relative to the lead aircraft associated with his aircraft, he must cause comparators 57, 58 and 59, shown in FIGURE 8, to receive additional vector component signals corresponding to these predetermined distances. This is accomplished in the illustrated embodiment by a control panel 62 containing potentiometer 64 and center-tapped potentiometers 65 and 66 connected to suitable signal sources 67 and 68. Signal source 67 and potentiometer 64 are chosen such that the maximum signal developed across the potentiometer is a function of some maximum distance X, for example 18,000 feet, which is expected to be encountered in any station keeping operation. The slider of potentiometer 64 is suitably positioned to pick off the voltage corresponding to the desired X separation distance, and this voltage is supplied to multiplier unit 69 through a switch 70 having contacts 71 and 72. Since the desired lateral separation Y and the desired vertical separation Z customarily are expressed in a station keeping operation as distance with respect to a spatial location directly behind the lead aircraft in the lateral and vertical planes, each of Y potentiometer 65 and Z potentiometer 66 is center-tapped so that voltages picked off these potentiometers by their respective sliders provide signals having a magnitude and polarity corresponding to the desired separation in the lateral and vertical planes, respectively, from this aft spatial location. The Y voltage thus developed is supplied through switch 73 having contacts 73a and 73b to multiplier unit 69, while the Z voltage thus developed is supplied directly to the multiplier unit.

The signal received by comparators 57, 58 and 59 from resolver chain 51 are unit vector component signals representing the true measured spatial orientation of the follow aircraft with respect to its lead aircraft, so the signal outputs from control panel 63 representing desired distances along the X, Y and Z axes must be converted to a unit vector scale to permit comparison with the corresponding outputs of resolver chain 51 and also to take into consideration the actual or measured slant range distance between the two aircraft, as obtained in the apparatus depicted in FIGURE 5. This is accomplished in multiplier unit 69 wherein each of the X, Y and Z signals is separately multiplied by the factor $1/SR$ where SR equals the measured slant range. The outputs of multiplier unit 69 are $x$, $y$ and $z$ vector component signals which have the same scale as the output signals from resolver chain 51 and which are supplied respectively to signal comparators 57, 58 and 59.

As an alternative to the foregoing technique of dividing the signals representing desired distance by the slant range to obtain unit vector component signals, the unit vector component signals from resolver chain 51, representing the measured spatial orientation of the follow aircraft with respect to the lead aircraft, can be multiplied or scaled upwardly by the measured slant range to obtain measured distance signals X, Y and Z which can be supplied to comparator units for comparison with the X, Y and Z outputs taken directly from the control panel 63.

The magnitude and polarity of the output signals from control panel 63 are chosen so that the vector component signal representing a certain distance and supplied from multiplier unit 69 to each of the comparators is equal in magnitude and opposite in polarity to a measured position vector component signal from resolver chain 51 corresponding to the same amount of distance. Accordingly, when the measured follow aircraft position on a given axis actually corresponds to the desired follow aircraft position on that axis as set into control panel 63 by adjustment of a potentiometer therein, that one of comparators 57, 58 and 59 receiving the inputs of that axis provides a zero or null output. By way of example, when the signals supplied to comparator 58 and corresponding to measured and desired lateral separation $y$ are equal in magnitude and of opposite polarity, the output of this comparator is zero, indicating that the follow aircraft is occupying its desired position in the lateral or Y plane. Any deviation of the follow aircraft in either direction along the lateral plane causes the measured value of $y$ on output 55 to change, as well as causing a change in the measured slant range supplied to multiplier unit 69; and so the magnitude and polarity of these changes causes the output of comparator 58 to change from zero to a polarity and magnitude indicating the direction and extent of follow aircraft deviation from the desired formational position.

The outputs of comparators 57, 58 and 59 are supplied to a data display unit 74 for viewing in suitable form by the pilot of the aircraft. The indicators of data display unit 74 can, by way of example, take the form of needle-type indicators of the ILS type providing "fly left—fly right," "fly up—fly down," and "increase thrust—decrease thrust" information for the pilot. Indicators of this type are nulled only when the actual position of the follow aircraft corresponds to the desired position as set into control panel 63. Alternatively, the outputs of comparators 57, 58 and 59 may be supplied to a suitable flight director computer forming no part of the present invention and having indicators which are nulled when the corrective action taken by the pilot is that which will cause the aircraft to assume its proper location with respect to the lead aircraft. As a further alternative, the output of these comparators can be coupled with suitable automatic flight control equipment to cause the aircraft control surfaces and powerplant settings to assume automatically those positions which will cause correct formational orientation of the follow aircraft.

In the operation of this apparatus to perform station keeping functions, the master timing unit 38 of the apparatus in a particular aircraft is furnished with information about the formation position number of that aircraft and the time slot or time slots during which the interrogator unit and/or beacon transponder of that aircraft are to be operative. As shown in FIGURES 3 and 4, a given aircraft may serve as the lead aircraft for a plurality of follow aircraft, and so the master timing unit 38 in this aircraft must be adjusted accordingly. Once the station keeping apparatus of each aircraft in the formation has been supplied with formation position information and desired spatial separation information, the station keeping apparatus in each aircraft is switched to the search mode, as outlined above, so that the station keeping apparatus in each aircraft can become synchronized to the master aircraft and then can lock on and commence tracking the transponder beacon in its assigned lead aircraft.

In a formation such as depicted in FIGURE 3, if any of aircartf number three, six, nine or ten should be required to drop out of the formation, no changes in any of the remaining aircraft will be required since none of the aforementioned four aircraft serve as a lead aircraft for another aircraft. If any of the aircraft in positions two, five or eight leave the formation, then the pilots of the affected aircraft in positions three, six or nine, respectively, must switch the time slots of their station keeping apparatus to correspond to the formation position number of the aircraft which left the formation. This pilot then must change the settings for desired thrust line separation ($x$), desired lateral separation ($y$), and desired vertical separation ($z$) to correspond to the formation position of his aircraft with respect to the newly assigned lead aircraft therefor.

In a similar manner, the absence of aircraft number four from the formation can be cured by having the pilot of aircraft number five switch both the interrogator unit and the beacon transponder of his station keeping apparatus to be activated in the same time slots that were previously assigned to aircraft number four. The pilot of aircraft number five will then, after resetting his desired position controls to the values previously maintained by the aircraft in position four, fly his aircraft in position four, fly his aircraft into the formation position previously occupied by aircraft number four. The reaction of the pilot in aircraft number six then will be the same as described above as if aircraft number five had dropped out.

In a similar manner, the absence of any of the other aircraft in the formation can be accounted for. If it is assumed, for example, that aircraft number one, the source of master timing pulses for the formation, is forced to drop out, then the pilot of aircraft number two will switch the beacon transponder of the apparatus to function as the master station and also to function in time slots three and four so as to provide lead aircraft functions for aircrafts three and four of the formation.

Offset terminal approach

It is apparent that the apparatus thus far described is capable of tracking a beacon transponder generally and is not limited to the situation wherein this transponder is contained in another aircraft. By way of example, a beacon transponder can be situated on the ground and an aircraft equipped according to this invention can track this transponder within the angular scan limits of the aircraft interrogation antenna, usually located at the nose of the aircraft. More importantly, the ground based beacon transponder can be situated some distance away from an intended terminal location over which the aircraft is to fly, and an aircraft containing apparatus of this invention which has been supplied with the position of the intended terminal location relative to the position of the transponder then is enabled to fly directly over this location.

The foregoing situation may be explained with reference to FIGURE 10, wherein it is desired to fly an aircraft over an arbitrarily positioned location 79 either to make an aerial drop or for any other purpose. If it is not feasible to locate a beacon transport in the immediate vicinity of location 79, as for example in the situation where the drop zone represents friendly forces locally surrounded by hostile forces, then it may be possible to position a portable beacon transponder 80 at some substantial distance from the location. Once the transponder 80 is positioned, there must be ascertained the bearing $\alpha$ of location 79 relative to true north, and the distance between the drop zone and the transponder, designated in FIGURE 10, as the "offset range." This information may be obtained by observation and conventional range-finding techniques, if possible, or by suitable cartographic or other procedures.

The aircraft approching location 79 may assume any heading within the tracking capabilities of the aircraft nose antenna. Assume, for example, that the true heading of an aircraft 78 is along the course designated 77 in FIGURE 10. The pilot in this aircraft has been informed of the offset range and the location bearing $\alpha$, and this information is inserted into the apparatus of this invention in a manner described below. Since the measured slant range between the aircraft and the transponder is broken into orthogonal unit vector components on the orthogonal $x$, $y$ and $z$ axes, then the apparatus in the aircraft must compute the $x$ and $y$ values corresponding to the location 79 relative to the transponder 80 at the true heading presently assumed by the aircraft. This is done according to the following equations:

(1) $X_1 = OR \cos \delta = OR \cos (\alpha + 180° - TH)$
(2) $Y_1 + Y_2 = OR \sin \delta = OR \sin (\alpha + 180° - TH)$ where OR is the present offset ground range from the aircraft to the transponder, TH is the true heading of the aircraft, $\delta$ is the angle between the true heading and the offset range, and clockwise angular rotation from true north is positive in sign.

Solution of Equations 1 and 2 provides the distance components $X_1$ and $Y_1 + Y_2$, respectively, which represent offset range components of location 79 on X and Y axes parallel to and perpendicular to the present line of flight of aircraft 78 and which establish coordinates along these axes of the desired location 79 to which the aircraft is to be flown. At the same time, there must be developed the distance components $X_2$ and $Y_1$, representing the X and Y components of the measured slant range between aircraft 78 and transponder 80 and establishing coordinates of the measured present location of the aircraft along with the same axes with which the coordinates of location 79 are measured. It can be seen that the values of $X_1$, $X_2$, $Y_1$, and $Y_1 + Y_2$ not only are determined by the offset range and the measured location of aircraft 78 but also are dependent on the true heading of the aircraft.

Turning again to FIGURES 7, 8 and 9, there is shown apparatus whereby the foregoing equations for the X and Y components or the aircraft "desired position" are computed. Once these desired position values are obtained, these values then may be supplied through multiplier 69 to comparators 57, 58 and 59 for comparison with the measured position of the aircraft with respect to transponder 80 as derived in resolver chain 51.

The offset bearing angle $\alpha$ is inserted into the apparatus at 82 as shown on the suitable indicator 83 while the known offset ground range is supplied at input 84 and indicator 85. The offset bearing angle 82 is connected to the slider of a potentiometer 88 for a purpose described below and additionally is supplied to differential unit 89. Differential unit 89, which may be a differential synchro or the like, receives aircraft true heading from the ship's compass or other suitable source as a second input, and this differential unit combines these two angular inputs to produce an output $$\delta = (\alpha - TH + 180°)$$

the angular quantity called for in the foregoing Equations 1 and 2. This quantity $\delta$ is suppled through contact 90 of switch 91 to control transformer 92 and amplifier 93. The output of amplifier 93 is supplied to motor 94 to provide mechanical input to differential unit 95 and also to provide feedback information to control transformer 92.

The angle $\delta$ as applied to differential unit 95 is corrected to compensate for any drift discrepancy between the actual long-term heading of the aircraft and the indicated true heading from the compass system. This corrected value of $\delta$ is then supplied through control transformer 96 and amplifier 97 to drive motor 98 to provide a suitable mechanical output for operating the drift resolver in resolver chain 51. Since drift information is required during the station keeping mode of operation of the apparatus, differential unit 95 is supplied with a zero-heading signal from a suitable source 102 such as, for example, a synchro transmitter having its rotor locked at a position corresponding to zero degrees. This zero-heading signal is supplied when switch 91 is moved to contact 90a, a situation which occurs only during a station keeping operation as described above.

The $\delta$ angular output from differential unit 89 also is supplied through a suitable servo device 103 to drive the rotor of resolver 104. The electrical input signal to this resolver is derived from the slider of potentiometer 105, which is connected across a suitable source of voltage. This potentiometer slider is mechanically connected to be moved by offset range input 84 so that the excitation voltage applied to resolver 104 is a function of the offset range inserted into the apparatus. Resolver 104 operates in the customary manner to produce a cosine output at 106, which is connected to contact 72 of switch 70, and a sine output at 107, which is connected to contact 73a of switch 73.

In the operation of this embodiment of the apparatus to provide terminal approach information relative to some location 79, FIGURE 10, relative to a beacon transponder 80 at some offset distance from the location, it is assumed that the aircraft is approaching location 79 along some heading 77 which does not necessarily pass over location 79 and which permits transponder 80 to be tracked by nose antenna 35 of the aircraft. The pilot manually inserts into the apparatus the offset bearing angle $\alpha$ at 82 and the offset ground range at 84. Switch 91 is engaged with contact 90 and switches 70 and 73 are engaged with respective contacts 72 and 73a to place the apparatus in the offset terminal approach (OTA) mode of operation. Since only one transponder is in operation in the example chosen, no time sharing is involved and so master timing unit 38 can be set to cause periodic transmission of interrogation signals at a desired rate. Once the apparatus has received a response from transponder 80 and has switched to the track mode, resolver chain 51 produces $x$ and y output signals indicating the measured vector location of the aircraft with respect to the transponder 80 and as corrected by the true heading input supplied through differential unit 95 into resolver chain 51 for the fact that the intended path of the aircraft at this time is not necessarily on a heading which will carry the aircraft toward transponder 80 or location 79. The $x$ and $y$ output signals of resolver chain 51 thus are unit vector components corresponding, respectively, to the distances $X_2$ and $Y_1$, as shown in FIGURE 10.

At the same time, the offset ground range set into the apparatus at 84 is being transformed by resolver 104 into sine and cosine components to solve the aforementioned Equations 1 and 2, thus providing X and Y information indicating the X-Y coordinate position of location 79 with respect to transponder 80 for the particular true heading of the aircraft, or in other words, the desired location to which the aircraft is to be flown as represented by the distances $X_1$, and $Y_1+Y_2$ in FIGURE 10. These X and Y inputs, along with a Z signal preset into potentiometer 66, if desired, are supplied to multiplier unit 69 where the signals are divided as described above by the present measured slant range between the aircraft and transponder 80 to provide unit vector $x$, $y$ and $z$ component signals to comparators 57, 58 and 59. Thus, each of these comparators is supplied with one signal indicating the measured location of the aircraft, i.e., location 78, in a particular set of axes and the desired location of the aircraft, i.e., location 79, in the same set of axes. Taking into consideration the actual heading of the aircraft at that time, any differences between measured and desired signals in the three axes appear at data display 74 to provide information enabling the pilot to provide any necessary corrections.

Assuming as shown in FIGURE 10 that the aircraft is presently on a true heading 77 which will cause it to pass to the left of location 79, then the distance $Y_1+Y_2$ is greater than the distance $Y_1$ and so the Y error indicator presents a fly-right indication. The distance $X_2$ at this time is greater than the distance $X_1$, and so the X indicator presents a reading indicating that location 79 has not yet been reached. When the heading of the aircraft is changed to cause the aircraft to fly toward location 79, the distances $Y_1+Y_2$ and $Y_1$ will be identical and so the Y error indicator will be nulled. At the time when the aircraft flies over location 79, the X and Y indicators will both indicate null signals and then will commence indicating the fact that this location now is behind the aircraft. The Z signal functions in the same manner as described with respect to the station keeping operation and may be used in the offset terminal approach mode optionally with conventional aircraft altimeter equipment.

In an exemplary operation of the offset terminal approach mode, the pilot must watch data display 74 to detect concurrent nulling of the X and Y indicators, so that he may initiate or cause to be initiated the discharging from the aircraft of cargo or some other load. Since the aircraft quickly flies through the X-null zone, momentary inattention on the part of the pilot may cause him to miss this event. To overcome this problem, a second $x$ comparator 108 and a second $y$ comparator 109 have been provided, each receiving input signals indicating the measured and desired location of the aircraft along these two axes. The outputs of comparators 108 and 109 are supplied to respective null detectors 110 and 111, shown in FIGURE 9. These null detectors can be set to provide an output signal only in the absence of a signal from the respective comparator or, alternatively, either or both of null detectors 110 and 111 may be set to provide an output signal when the input from the respective comparator is within a predetermined deviation from null, thus effectively providing a bracketed zone on the X and Y axes and centered on location 79. The outputs of each of null detectors 110 and 111 go to AND gate 112, and the output from this AND gate is supplied to operate relay 113 for energizing signal 114 only in the concurrent presence of outputs from each of null detectors 110 and 111. In this manner, a signal is automatically provided the pilot when the aircraft passes over location 79 or through the aforementioned bracketed zone so that the pilot need not constantly direct his attention to data display 74. If desired, relay 113 could be connected to initiate automatic discharge of the load.

*Actual location determination*

In the immediately foregoing sequence of operations, the apparatus of this invention was used to provide signals indicating the measured actual location of an aircraft with respect to some desired location physically offset from transponder 80. In this operation when the $x$ and $y$ signals were nulled, it is apparent that the actual ground range and the actual offset bearing angle $\alpha$ of the aircraft with respect to the location of transponder 80 were at that instant identical to these values as inserted at inputs 84 and 82. Accordingly, it becomes possible to determine the actual offset ground range and the actual offset bearing angle $\alpha$ of an aircraft at any position or location with respect to transponder 80 so long as tracking of the apparatus with the transponder is established. This capability is provided automatically by feeding back the $x$ and $y$ unit vector component signals as obtained from resolver chain 51 to cause range and angle inputs 84 and 82 to assume the positions which produce null, $x$ and $y$ outputs from comparators 57 and 58.

To accomplish this, $x$ and $y$ vector component information is supplied by way of lines 120 and 121 to provide inputs for resolver 122. Resolver 122 is of the type wherein that position of the rotor which causes resolver output 123 to be nulled produces at resolver output 124 a signal which is the vector sum of the $x$ and $y$ inputs to the resolver. Stated differently, output 124 under conditions of a nulled output 123 corresponds to the function $$(x^2+y^2)^{1/2}$$

This output signal from 124 is multiplied at 125 by the measured slant range as determined by data procurement section 27 to provide a range signal scaled to the actual unit of distance measurement being used. This range signal output from multiplier 125 is applied through amplifier 126 to cause operation of motor 127. If switch 128 has been actuated, magnetically operated clutches 129 (FIG. 8) and 130 (FIG. 7) are engaged and the mechanical output from motor 127 is coupled to cause movement of the mechanical linkage including offset range indicator 85 and the slider of potentiometer 131.

Output 123 of resolver 122 is supplied to amplifier 132 and motor 133. Operation of motor 133 causes movement of the linkage including offset bearing indicator 83 and the slider of potentiometer 88. Potentiometer 88 provides a feedback signal to amplifier 132 which tends to cause motor 133, the output of which also is coupled to the rotor of resolver 122 when clutch 130 is engaged, to drive this resolver to a position in which output 123 is nulled.

In a similar manner, potentiometer 131 provides a feedback signal to amplifier 126 so that the inputs to this amplifier cancel one another when offset range indicator 85 has been driven by motor 127 to indicate the actual offset range as applied to amplifier 126 from multiplier 125.

From the foregoing, it can be seen that upon actuation of switch 128 resolver 122 is driven in a direction tending to cause nulling of output 123. This movement is coupled through differential units 89 and 95 into resolver chain 51 so as to provide a feedback signal to enable resolver 122 to be nulled at a position wherein offset bearing indicator 83 indicates the actual bearing between the aircraft and transponder 80. At the same time, range indicator 85 indicates the actual ground range between the aircraft and the transponder. Although these operations are provided automatically when swtich 128 is actuated, when these actual angular and range indications have been obtained the output of resolver 104 as applied through multiplier 69 provides inputs to comparators 57 and 58 which provide nulling of data display 74 in $x$ and $y$.

*Landing approach glide path*

In addition to the applications described above, the apparatus of this invention can also be used as a landing approach path control. In this manner the functions of the conventional Instrument Landing System (ILS) can be performed with no ground equipment being required other than a ground beacon transponder situated at a known distance from the runway. The advantages of such an instrument controlled approach and landing system for relatively undeveloped areas are readily apparent.

The geometry of the ILS function is shown in FIGURES 11 and 12. An aircraft at location 138 desiring to land on runway 140 is to be flown, for example, to location 139 whereat the aircraft will be turned to be aligned with the runway and the glide slope can be commenced. A ground beacon transponder has previously been positioned at some offset distance Y from the runway and at a known ground distance X from location 139. With this information and knowing the true heading of the aircraft and the bearing of the runway with respect to true north, a pilot can fly the aircraft from location 138 to location 139 using the apparatus of this invention in its offset terminal approach mode as described above. Arrival of the aircraft at location 139 is signaled by concurrent detection of null X and Y error signals.

Once location 139 has been reached, the apparatus of this invention is switched automatically or manually to the ILS mode of operation. To accomplish this, switch 70 remains on contact 72, switch 73 is returned to contact 73b, switch 91 remains on contact 90, and switch 141 is moved from contact 142 to contact 143. The runway bearing remains as input at 82 while the ground distance X is set in at 84 as offset ground range. The transverse distance Y between the transponder and the runway is set in at potentiometer 65, and these inputs along with aircraft true heading and aircraft attitude data provide $x$ and $y$ signals enabling the pilot to fly the aircraft from location 139 toward the runway.

Referring to FIGURE 12 wherein is shown a schematic elevation view of the ILS mode of operation, it is seen that an aircraft approaching runway 140 must intercept glide slope 145 at some point 144 and commence flying down this glide slope. While glide slope 145 is customarily defined by some glide slope angle, it can be seen that for any location 146 at a given ground distance from the beacon transponder there exists a location 147 on the glide slope having a certain altitude which is easily computable from the ground distance through the application of known trigonometric techniques or trigonometric approximations. Thus, the altitude Z of any location 147 on the glide slope is a mathematical function of the ground distance of corresponding location 146 from the beacon transponder.

Returning ot FIGURES 7 and 8, the actual ground distance from location 146 to the beacon transponder as represented by $x$ vector component information from output 54 of resolver chain 51 is supplied to glide slope computer 151. The glide slope computer performs the aforementioned mathematical operation to derive the altitude unit vector component $z$ of a given location on glide slope 145 corresponding to the actual ground distance X of the aircraft from the touchdown point on the runway as measured by the apparatus of this invention. The $z$ unit vector component output of glide slope computer 151 is supplied through contact 143 of switch 141 to comparator 59 to be compared with a $z$ signal from resolver chain 51 representing the measured altitude of the aircraft at this time.

In a similar manner, the measured $x$ distance may also be supplied to a series of marker distance comparators indicated generally at 152. These comparators 152 are also supplied with one or more reference signals 153 corresponding to predetermined and fixed ground distances from the end of the runway. In prior art ILS systems these distances are designated by ground based radio transmitters providing a plurality of fan-shaped beams, and the distances may be referred to as the "outer marker," "middle marker," and "inner marker" distances. By comparing the reference signals 153 with the $x$ signal representing actual ground distance, indicators 154 for each of the fixed ground distances sought can be illuminated when the actual distance corresponds to the predetermined distance, thus informing the pilot of his progress along the glide path.

In the operation of this apparatus in the ILS mode, the pilot causes the aircraft to fly toward localizer interceptor point 144. This point 144 may coincide with approach intercept location 139, as shown in FIGURE 11, or point 144 may be at some position between location 139 and the runway. Prior to interception of point 144 the aircraft is beneath the glide slope 145 and so the pilot receives a $z$ error signal commanding him to fly the aircraft up. This signal is ignored, however, and the aircraft continues flying at a desired altitude toward point 144. When this point is reached the $z$ error signal from comparator 59 is nulled, and as the point is passed the pilot then begins to receive a fly-down signal which he heeds by causing the aircraft to fly downwardly until the $z$ error signal again is nulled. By maintaining a null $z$ error signal, it can be seen that the aircraft is caused to fly down glide slope 145 toward the end of runway 140. Indicators 154 will be illuminated as the measured ground distance from their aircraft to the runway corresponds to outer marker distance, middle marker distance, or inner marker distance, at which point the pilot must be prepared to leave the glide slope and go around for another landing attempt if he has not visually sighted the runway.

According to the foregoing, there has been disclosed a station keeping and navigation aid system which is completely contained within an aircraft, except for a relatively inexpensive and uncomplicated remotely positioned beacon transponder, and which enables this aircraft to provide the multiple functions of station keeping, offset terminal approach, location determination with respect to a remotely positioned transponder, and ILS glide path definition, thus greatly adding to the versatility of an aircraft containing this apparatus and operating in regions or out of airports not necessarily equipped with expensive and complex ground navigation aids. The data procurement and data analysis sections of this invention, which are basic to the station keeping mode of operation thereof, provide information which readily enables the last-mentioned three functions to be added to the basic station keeping function through the addition of a relatively small amount of additional apparatus, thus providing a significant savings in weight and volume over the provision of separate systems to provide separately two or more of these functions.

Although the herein described embodiment of this invention utilizes electromechanical components such as synchro elements, resolves, linkages and the like, it is to be understood that this is by way of example only and that these functions could be performed partly or completely by suitable electronic apparatus as permitted or required by the needs of a particular application.

It should be understood of course that the foregoing relates to only a preferred embodiment of the invention and that numerous modifications or alterations may be made therein without departing from the spirit and the scope of the invention as set forth in the appended claims.

What is claimed is:

1. In a vehicular system for enabling vehicular navigation to be accomplished in correspondence with a remotely located transponder, the combination comprising:

transmitter means carried by a vehicle and operative for transmitting interrogation signals;

receiver means carried by the vehicle and operative for receiving a reply signal transmitted by a remotely positioned transponder responsive to an interrogation signal transmitted by said transmitter means;

directional antenna means mounted on the vehicle and connected to furnish the reply signals to said receiver means;

said receiver means producing as a first output a slant range signal which is a function of the time elapsed between the transmission of an interrogation signal and the reception of a reply signal thereto;

said receiver means producing a second output indicative of the angular position of the transponder location relative to the vehicle; and data analysis means connected to receive said first and second outputs of said receiver means,
- said data analysis means including coordinate conversion means functioning to produce output signals corresponding to the actual distance of separation between the vehicle and the transponder location as measured along selected orthogonal axes.

2. The combination as in claim 1 further comprising:

desired location signal means producing an output corresponding to a desired separation distance of the vehicle relative to the transponder location as measured along said orthogonal axes; and readout means receiving the output of said data analysis means and the output of said desired location signal means,
said readout means producing an output indicating the variance between the measured and desired separation distances between the vehicle and the transponder location as measured along each of said orthogonal axes.

3. The combination as in claim 1 wherein:

said second output of said receiver means indicates the angular position of the transponder location relative to the vehicle in both the azimuth plane and the elevation plane.

4. Apparatus as in claim 3, wherein:

said selected orthogonal axes comprise the course of vehicle heading, the vertical component of separation between the vehicle and the transponder location, and the lateral component of separation between the vehicle and the transponder location; and further comprising desired location signal means producing output signals corresponding to desired distances of separation taken along said selected orthogonal axes; and readout means connected to receive the measured separation output signals of said coordinate conversion means and the desired separation output signals of said desired location signal means,
said readout means comparing the measured separation and desired separation signals along each of said orthogonal axes and producing an output indicative of any variance between the measured and desired distances.

5. Apparatus as in claim 4, wherein:

said desired location signal means includes desired glide slope signal means carried by the vehicle;

said desired glide slope signal means receiving from said coordinate conversion means information corresponding to the measured separation distance between the present vehicle location and a transponder of known location relative to a desired touchdown location as measured along the effective vehicle heading line;

said desired glide slope signal means including means responsive to said measured separation distance information to produce a glide slope altitude output signal proportional to said measured separation information and indicative of the desired vehicle altitude at the glide slope point defined by said measured separation distance; and connecting means supplying said glide slope altitude output signal to said readout means whereat said altitude output signal is compared with the vertical component of measured separation between the vehicle and the transponder produced by said coordinate conversion means and corresponding to actual vehicle altitude.

6. Apparatus as in claim 4, further comprising:

input means connected to said coordinate conversion means to supply thereto a signal which is a function of the actual compass bearing of the desired location relative to the transponder location and of the effective vehicle heading;

said coordinate conversion means operating on all of the input information supplied thereto produce a first output signal and a second output signal, said first and second output signals being vector components along said selected orthogonal axes of the measured separation distance between the transponder and the vehicle;

said first output signal of said coordinate conversion means corresponding to a component of said measured separation distance as measured along a line from the transponder to a perpendicular intersection with the effective heading path of the vehicle; and said second output signal of said coordinate conversion means corresponding to a component of said measured separation distance from the vehicle along said effective heading path to said perpendicular intersection.

7. Apparatus as in claim 6, wherein:

said desired location signal means receives a first input corresponding to the vehicle heading, a second input corresponding to the actual compass bearing of the desired location relative to the transponder location, and a third input corresponding to the ground range between the desired location and the transponder location;

said desired location signal means operating on said three inputs thereto to produce a first output signal and a second output signal, said output signals of said desired location signal means being vector components along said selected orthogonal axes of the ground range when the desired location and the transponder location;

said first output signal of said desired location signal means corresponding to a component of said ground range as measured along a line from the transponder to a perpendicular intersection with a line parallel to the effective heading path of the vehicle and contacting the desired locations; and said second output signal of said desired location signal means corresponding to a component of said ground range as measured from the desired location along said contacting line to said perpendicular intersection thereon.

8. Apparatus as in claim 7, further comprising:

feedback means selectively operably engageable to supply said first and second output signals of said coordinate conversion means as additional inputs to said desired location signal means;

first auxiliary signal means producing a compass bearing indicative output signal of the type supplied by said second input to said desired location signal means and being operatively associated with said second input to said desired location signal means so that the compass bearing indicated by the output signal of said first auxiliary signal means corresponds to the compass bearing supplied to said desired location signal means so that the compass bearing indicated by the output signal of said first auxiliary means corresponds to the compass bearing supplied to said desired location signal means by said second input thereto;

second auxiliary signal means producing a ground range indicative output signal of the type supplied by said third input to said desired location signal means and being operatively associated with said third input to said desired location signal means so that the ground range indicated by the output signal of said second auxiliary signal means corresponds to the ground range supplied to said desired location signal means by said third input thereto;

said desired location signal means including comparator means receiving the signals supplied by said feedback means and also receiving said output signals from said first and second auxiliary signal means, said comparator means being operative to cause said first and second auxiliary signals and through said operative associations said second and third inputs to said desired location signal means to assume the values necessary to enable said first and second output signals of said coordinate conversion means to correspond respectively to the same distance values as said first and second output signals of said desired location signal means so that the compass bearing indication and ground range indication, respectively, of said first and second auxiliary signal means correspond to the measured location of the vehicle relative to the transponder location.

9. Apparatus for determining the position of a vehicle relative to a remotely located transponder, comprising in combination:

antenna means associated with the vehicle, said antenna means having a directional radiation pattern which is capable of being scanned along at least one plane of freedom to establish an antenna means frame of reference;

antenna scanning means operatively associated with said antenna means and selectively operable to position said directional radiation pattern along said at least one plane of freedom;

transmitter means carried by the vehicle and connected to supply energy to said antenna means;

receiver means carried by the vehicle and connected to receive signals present in the pattern of said antenna means;

said receiver means producing a first output indicative of the time elapsed between the transmission of an interrogation signal by said transmitter means and the reception of a reply signal transmitted in response thereto by a remotely located transponder, said first output being a function of the slant range between the vehicle and the transponder location;

said receiver means producing a second output consisting of signals corresponding to any angular deviation as seen in the antenna means frame of reference of the directional radiation pattern boresight of said antenna means from the location of a transponder producing the reply signal;

connecting means supplying said second output of said receiver means to said antenna scanning means, said antenna scanning means being operative in response to said second output of said receiver means to position said directional radiation pattern so as to minimize said second output and thus so as to cause the position of said directional radiation pattern to indicate the angular orientation in said antenna means frame of reference of the remote transponder location relative to the vehicle; and data resolution means connected to receive information indicating said angular orientation in said antenna means frame of reference of the remote transponder location relative to the vehicle, said data resolution means including coordinate conversion means operating on the angular information received thereby to produce output signals corresponding to the actual distance of separation between the vehicle and the transponder location as measured along selected orthogonal axes.

10. Apparatus as in claim 9, wherein:

said angular orientation information received by said data resolution means indicates the angular position of the remote transponder location relative to the vehicle in both the azimuth plane and the elevation plane.

11. Apparatus as in claim 9, further comprising:

desired location signal means selectably adjustable to provide output signals corresponding to the separation distances along said certain orthogonal axes between the transponder and a desired location of the vehicle; and comparator means, said comparator means receiving the output signals of said coordinate conversion means indicative of the measured location of the vehicle relative to the transponder location and also receiving the output from said desired location signal means corresponding to the desired location of the vehicle relative to the transponder, said comparator means providing an output corresponding to the difference between these two input signals along each of said certain orthogonal axes and therefore corresponding to the distances along said axes between the measured and the desired locations of the vehicle.

12. Apparatus as in claim 9, wherein:

said data resolution means additionally is connected to receive information of any deviation in vehicle attitude which causes a predetermined vehicle frame of reference to be rotated from a preselected attitude with respect to a desired frame of reference in which vehicle position determination is conducted, said data resolution means functioning in response to said vehicle attitude deviation information to rotate said antenna means frame of reference to correspond with said desired frame of reference.

13. Apparatus for enabling a vehicle forming part of a formation of vehicles to maintain a desired formation location by keeping a predetermined location with respect to a chosen other vehicle in the formation, comprising:

interrogation means carried by a vehicle;

first antenna means carried by the vehicle, said first antenna means having a directional characteristic and being operable to produce scanning of said directional characteristic in at least one plane, said first antenna means being operatively associated with said interrogation means;

transponder means carried by the vehicle and operative to produce a predetermined response signal in reply to an interrogation signal emanated from a location remote of the vehicle;

second antenna means carried by the vehicle and operatively associated with said transponder means for transmission and reception purposes, said second antenna means having substantially nondirectional characteristics over at least a portion of its radiation pattern; and control means carried by the vehicle and operatively associated with said interrogation means and said transponder means, said control means operating to define a set of cyclically recurring time slots, said control means functioning to cause said transponder means and interrogation means to operate in either a master mode, in which the vehicle serves to define the formational location of all other vehicles in the formation and to control the operation of companion apparatus associated with said other vehicles, or in a slave mode, in which the formational location of the vehicle is determined with reference to another vehicle in the formation, said control means when in said master mode of operation functioning to enable said transponder means to transmit a master timing pulse in a selected one of said cyclically recurring time slots and to enable said transponder means to transmit a reply signal only in response to an interrogation signal received during certain other of said cyclically recurring time slots, said control means when in said slave mode functioning to enable said interrogation means to be receptive to a master timing pulse transmitted from a location remote of the vehicle and to enable said interrogation means to transmit an interrogation pulse only during a predetermined one of said cyclically recurring time slots after a master timing pulse has been received, said control means when in said slave mode functioning to enable said transponder means only during a certain one or one of said cyclically recurring time slots to produce a predetermined reply signal in response to an interrogation signal received from another vehicle in the formation.

14. Apparatus as in claim 13, wherein:

said first antenna means is operable to cause the directional characteristic thereof to scan a region situated in proximity to the course of travel of the vehicle; and said second antenna means is situated on the vehicle so that the radiation pattern thereof extends to include and be receivable by companion apparatus in at least one other vehicle in the formation.

15. Apparatus as in claim 13, wherein:

said control means when in said slave mode functions to cause said first antenna means to execute a scanning function wherein there is scanned a region in proximity to the course of travel of the vehicle until a reply pulse is first received during said predetermined one of said cyclically recurring time slots in response to an interrogation signal emanated from said interrogation means, and said control means is responsive to said reply pulse to cause said first antenna means to track the source of the reply pulses after the first such pulse has been received.

16. In an airborne vehicular system for conducting vehicular guidance in accordance with a remotely located transponder, the combination comprising:

interrogation apparatus carried by the vehicle and operative to establish a tracking relationship with a remotely located transponder, said interrogation apparatus producing output signals corresponding to the slant range between the vehicle and the transponder and also corresponding to the angular position of the transponder relative to the vehicle;

data analysis means connected to receive said output signals of said interrogation apparatus, said data analysis means including coordinate conversion means functioning to produce output signals defining along selected orthogonal axes the measured spatial location of the vehicle relative to the transponder;

desired location signal means producing output signals defining a desired spatial location along said selected orthogonal axes of the vehicle relative to the transponder; and comparator means receiving said output signals of said data anualysis means and said output signals of said desired location signal means, said comparator means having outputs indicative of the variance between the measured vehicle spatial location and the desired vehicle spatial location relative to the transponder as measured along said selected orthogonal axes.

References Cited

UNITED STATES PATENTS

| | | | |
|---|---|---|---|
| 2,599,223 | 6/1952 | Blitz | 343—108 X |
| 3,119,107 | 1/1964 | Maresca | 343—6.5 X |
| 3,153,232 | 10/1964 | Fletcher et al. | 343—6 |
| 3,204,237 | 8/1965 | Overcash | 343—6.5 |
| 3,230,527 | 1/1966 | Wehde et al. | 343—6.5 X |
| 3,295,129 | 12/1966 | Tower | 343—11 X |
| 3,312,971 | 4/1967 | Gehman | 343—6.5 |
| 3,087,151 | 4/1963 | Vantine | 343—6.8 X |

RODNEY D. BENNETT, *Primary Examiner.*

M. F. HUBLER, *Assistant Examiner.*

UNITED STATES PATENT OFFICE
CERTIFICATE OF CORRECTION

Patent No. 3,409,888                                          November 5, 196

Thompson K. Speer, Sr.

It is certified that error appears in the above identified patent and that said Letters Patent are hereby corrected as shown below:

Column 10, lines 23 to 25, in the table, under the heading "Roll", the Greek letter "$\theta$", four occurrences, should read -- $\phi$ --. Column 20, line 20, after "thereto" insert -- to --; line 49, "when" should read -- between --; line 56, "locations" should read -- location --; same column 20, line 75 to col 21, line 3, cancel "so that the compass bearing indicated by the output signal of said first auxiliary means corresponds to the compass bearing supplied to said desired location signal means". Column 23, line 21, "one", second occurrence, should read -- ones --.

Signed and sealed this 17th day of March 1970.

(SEAL)
Attest:

Edward M. Fletcher, Jr.                                WILLIAM E. SCHUYLER, JR.
Attesting Officer                                                 Commissioner of Patents